US012640576B2

(12) United States Patent　　　(10) Patent No.: US 12,640,576 B2
Prasad　　　　　　　　　　　　(45) Date of Patent: May 26, 2026

(54) DISTRIBUTED ENERGY STORAGE

(71) Applicant: SCHNEIDER ELECTRIC IT CORPORATION, Foxboro, MA (US)

(72) Inventor: Himamshu Viswathmula Prasad, Tewksbury, MA (US)

(73) Assignee: SCHNEIDER ELECTRIC IT CORPORATION, Foxboro (MA)

( * ) Notice: Subject to any disclaimer, the term of this patent is extended or adjusted under 35 U.S.C. 154(b) by 77 days.

(21) Appl. No.: 18/796,980

(22) Filed: Aug. 7, 2024

(65) Prior Publication Data

US 2026/0045814 A1　　Feb. 12, 2026

(51) Int. Cl.
H02J 7/00　　　　　(2026.01)

(52) U.S. Cl.
CPC ........... H02J 7/865 (2026.01); H02J 2207/20 (2020.01)

(58) Field of Classification Search
CPC ............................ H02J 7/0068; H02J 2207/20
See application file for complete search history.

(56) References Cited

U.S. PATENT DOCUMENTS

2014/0266289 A1*　9/2014　Della Sera .............. H02S 50/00
　　　　　　　　　　　　　　　　324/761.01
2018/0054064 A1*　2/2018　Narla ...................... H02J 9/061
2018/0131226 A1*　5/2018　Narla ...................... H02S 40/38
2023/0208184 A1　6/2023　Bahei-Eldin et al.

FOREIGN PATENT DOCUMENTS

CA　　　3199762 A1　　1/2023
JP　　　2001016805 A　　1/2001
WO　　WO2022150607 A1　7/2022

* cited by examiner

*Primary Examiner* — Carlos Amaya
(74) *Attorney, Agent, or Firm* — Quinn IP Law

(57) ABSTRACT

A distributed energy storage unit (DES) is disclosed. The DES unit includes a combined input/output terminal configured to be coupled to an external circuit, power conversion circuitry operably coupled to the combined input/output terminal, an energy storage device operably coupled to the power conversion circuitry, and a controller. The DES unit is configured to operate the power conversion circuitry to provide charging power, derived from the input power, to the energy storage device, identify whether the external circuit is not receiving input power, and operate, in response to the external circuit not receiving the input power, the power conversion circuitry to provide backup power, derived from energy stored on the energy storage device, to the combined input/output terminal. Non-transitory computer readable medium for operating the DES unit and methods of providing output power from a DES unit are also disclosed.

33 Claims, 4 Drawing Sheets

DISTRIBUTED ENERGY STORAGE

BACKGROUND

At present, there exists two dedicated energy storage solutions for the residential or small and medium business (SMB) market-small scale solutions using individual uninterruptible power supplies (UPS) and large-scale battery storage solutions, e.g., Tesla POWERWALL®. While both have their applications, these systems can suffer from numerous disadvantages. Individual UPS units typically operate as standalone sources of backup power only for loads directly connected thereto. In contrast, large scale solutions such as large battery storage solutions require professional installation and have significant capital expenditure. Due to the high capacity of the battery connected to the charging system, large scale solutions can have inherent safety concerns as a large amount of energy is concentrated in a small location. In addition, larger scale solutions are typically designed for single family homes that have the supporting infrastructure for the installation, rendering them inaccessible for apartments, townhomes, and other smaller footprint residential environments. It is thus an object of the present disclosure to provide a distributed energy storage (DES) system effectively capturing the benefits of large-scale distributed energy solutions in a form factor that has the usability and convenience of existing small-scale UPS based solutions suitable for any type of residential environment, such as an apartment. Such a system can handle multiple loads, does not require aesthetically displeasing wiring, provides energy orchestration features, is easy to install, easy to scale, and does not carry a high initial cost.

SUMMARY

At least one example in accordance with the present disclosure relates generally to a distributed energy storage unit for circuits commonly found in the residential and SMB markets, e.g., residential or commercial circuit breaker panels. Power devices, such as uninterruptible power supplies (UPSs), may be used to provide regulated, uninterrupted power for directly attached loads, but have not yet been scalable to provide backup power for large scale residential use. Existing large-scale solutions, such as photovoltaic (PV) panels and large capacity battery charging, are expensive and in the case of PV panels, limited by solar flux.

In accordance with an aspect, there is provided a distributed energy storage (DES) unit. The distributed energy storage unit may include a combined input/output terminal configured to be coupled to an external circuit. The distributed energy storage unit may include power conversion circuitry operably coupled to the combined input/output terminal. The distributed energy storage unit further may include an energy storage device operably coupled to the power conversion circuitry. The distributed energy storage unit additionally may include a controller. The controller may be configured to operate the power conversion circuitry to provide charging power, derived from the input power, to the energy storage device. The controller may be configured to identify whether the external circuit is not receiving input power. The controller further may be configured to operate, in response to the external circuit not receiving the input power, the power conversion circuitry to provide backup power, derived from energy stored on the energy storage device, to the combined input/output terminal.

In further embodiments, the distributed energy storage may include a sensor configured to detect when the external circuit loses input power and when input power is restored to the external circuit.

In some embodiments, the power conversion circuitry may include a converter configured to convert AC input power from the external circuit to DC power and provide the DC power to the energy storage device as the charging power. The power conversion circuitry further may include an inverter configured to convert DC power from the energy storage device to AC power and provide the AC power to the combined input/output terminal as the backup power.

In some embodiments, the power conversion circuitry may include a bidirectional AC-DC converter, e.g., a single unit that is configured to convert AC input power from the external circuit to DC power and provide the DC power to the energy storage device as the charging power and further configured to convert DC power from the energy storage device to AC power and provide the AC power to the combined input/output terminal as the backup power.

In further embodiments, the controller may be configured to provide a notification when input power is restored to the external circuit.

In further embodiments, the controller may be configured to control a circuit breaker of the external circuit. The controlled circuit breaker may be a main circuit breaker. Alternatively, or in addition, the controlled circuit breaker may be one or more branch circuit breakers. For example, the controller may be configured to operate the main circuit breaker of the external circuit to open when the external circuit does not receive power, e.g., no power is being delivered from a mains source. In further embodiments, the controller may be configured to operate the main breaker to close in response to the external circuit receiving input power, e.g., power is restored to the mains source.

In further embodiments, the controller may be configured to selectively operate one or more branch circuit breakers of the external circuit. The one or more branch circuit breakers may be selectively operated to open when the external circuit does not receive power, e.g., no power is being delivered from a mains source. In further embodiments, the controller may be configured to operate the one or more branch breakers to close in response to the external circuit receiving input power, e.g., power is restored to the mains source.

In some embodiments, the controller may be configured to leave closed a main circuit breaker of the external circuit when the external circuit does not have power, e.g., only operate one or more branch circuit breakers to open.

In further embodiments, the controller may be configured to communicate with a main circuit breaker and one or more branch breakers of the external circuit using a wired connection. Alternatively, or in addition, the controller may be further configured to communicate with a main circuit breaker of the external circuit using a wireless connection. In some embodiments, the controller may be further configured to communicate with one or more branch circuit breakers using a wireless connection.

In some embodiments, when the distributed energy storage unit is receiving power from the external circuit, the power conversion circuitry is further configured to provide output power to a first load coupled to the combined input/output terminal.

In some embodiments, the power conversion circuitry, in providing the backup power to the combined input/output terminal, may be configured to provide to provide backup power to an output terminal having a second load coupled thereto.

In further embodiments, the controller may be configured to communicate with an electronic device running an application permitting operation of at least one of the DES unit or the external circuit from the external device.

In accordance with an aspect, there is provided a method of providing power to an external circuit using a distributed energy storage unit. The distributed energy storage unit may include a combined input/output terminal coupled to the external circuit, power conversion circuitry operably coupled to the to the combined input/output terminal, an energy storage device operably coupled to the power conversion circuitry, and a controller configured to operate the power conversion circuitry. The method may include monitoring power received by the external circuit. The method further may include operating the power conversion circuitry to provide charging power, derived from the input power, to the energy storage device. The method further may include identifying whether the external circuit is not receiving input power. The method additionally may include operating, in response to the external circuit not receiving the input power, the power conversion circuitry to provide backup power, derived from energy stored on the energy storage device, to the combined input/output terminal.

In further embodiments, the method may include operating a main circuit breaker of the external circuit to open responsive to the external circuit not receiving the input power.

In further embodiments, the method may include selectively operating one or more branch circuit breakers of the external circuit to open responsive to the external circuit not receiving the input power.

In further embodiments, the method may include identifying when input power is restored to the external circuit. Responsive to input power being restored to the external circuit, the method may include operating the main circuit breaker of the external circuit to close. Alternatively, or in addition, and responsive to input power being restored to the external circuit, the method may include operating the one or more branch circuit breakers of the external circuit to close responsive to input power being restored to the external circuit.

In further embodiments, the method may include connecting one or more additional DES units, e.g., a plurality of DES units, to the external circuit.

In accordance with an aspect, there is provided non-transitory computer-readable medium storing thereon instructions for operating a distributed energy storage unit comprising a combined input/output terminal coupled to the external circuit, power conversion circuitry operably coupled to the to the combined input/output terminal, an energy storage device operably coupled to the power conversion circuitry, and a controller configured to operate the power conversion circuitry. The instructions for operating the distributed energy storage unit may instruct at least one processor of the controller to operate the distributed energy storage unit to monitor an input power received by the external circuit. The instructions for operating the distributed energy storage unit may instruct at least one processor of the controller to operate the distributed energy storage unit to operate the power conversion circuitry to provide charging power, derived from the input power, to the energy storage device. The instructions for operating the distributed energy storage unit may instruct at least one processor of the controller to operate the distributed energy storage unit to identify whether the external circuit is not receiving the input power. The instructions for operating the distributed energy storage unit additionally may instruct at least one processor of the controller to operate the distributed energy storage unit, in response to the external circuit not receiving the input power, the power conversion circuitry to provide backup power, derived from energy stored on the energy storage device, to the combined input/output terminal.

In some embodiments, the instructions for the operation of the distributed energy storage unit may instruct the at least one processor to operate a main circuit breaker of the external circuit to open responsive to the external circuit not receiving power.

In some embodiments, the instructions for the operation of the distributed energy storage unit instruct the at least one processor to operate one or more branch circuit breakers of the external circuit to open responsive to the external circuit not receiving power.

In some embodiments, the instructions for the operation of the distributed energy storage unit further may instruct the at least one processor to identify when input power is restored to the external circuit. Alternatively, or in addition, the instructions for the operation of the distributed energy storage unit further may instruct the at least one processor to operate the main circuit breaker of the external circuit to responsive to the input power being restored to the external circuit.

In some embodiments, the instructions for the operation of the distributed energy storage unit further may instruct the at least one processor to operate the one or more branch circuit breakers of the external circuit to responsive to the input power being restored to the external circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

Figure 1A:
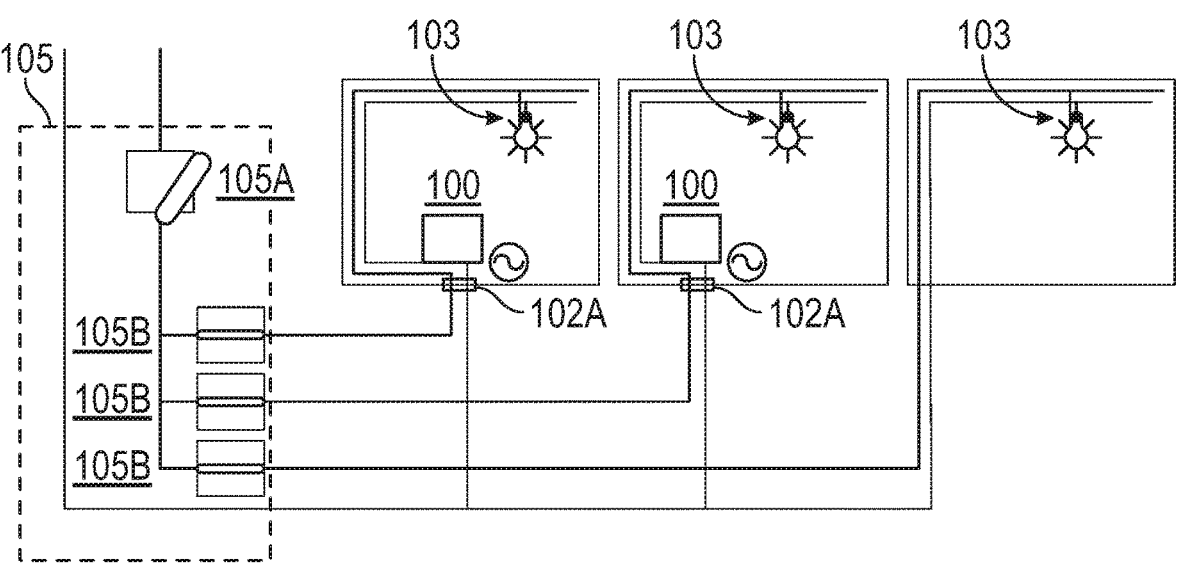
FIGS. 1A-1C illustrate scenarios for the operation of a main circuit breaker of an external circuit (FIG. 1A) and the operation of one or more branch circuit breakers of an external circuit (FIGS. 1B and 1C) when the external circuit is not receiving input power.

Examples of the systems and methods discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

DETAILED DESCRIPTION

A typical residential or commercial environment has input power, e.g., a mains source from a public utility, directed into a main circuit breaker held within a mounted safety panel enclosure. The main circuit breaker, generally on the order of 200 A, controls the flow of input power to a circuit including a plurality of branch circuit breakers. The branch circuit breakers are used to provide power to various locations in the residential or commercial environment. Individual branch circuit breakers typically operate at 15-20 A and are often used to control a single room, or a portion of a room, in a residential environment. When power from the mains is not provided to the main circuit breaker and one or more branch breakers, conventional solutions such as fuel-powered generators and battery systems, e.g., photovoltaic-based battery systems, can provide power to the main circuit breaker and one or more branch breakers such that electrical service is minimally interrupted.

It is an object of the present disclosure to provide a distributed energy storage unit, designed as a source of backup power, that has a controller configured to communicate with and operate one or more components of an external circuit such that backup power can be provided to specific branch circuit breakers without backfeeding the mains.

In accordance with an aspect, there is provided a distributed energy storage unit. The distributed energy storage unit includes a combined input/output terminal configured to be coupled to an external circuit. The distributed energy storage unit includes power conversion circuitry operably coupled to the combined input/output terminal. The distributed energy storage unit further includes an energy storage device, e.g., a battery, operably coupled to the power conversion circuitry. The distributed energy storage unit additionally includes a controller. The controller may be configured to operate the power conversion circuitry to provide charging power, derived from the input power, to the energy storage device. The controller may be configured to identify whether the external circuit is not receiving input power. The controller further may be configured to operate, in response to the external circuit not receiving the input power, the power conversion circuitry to provide backup power, derived from energy stored on the energy storage device, to the combined input/output terminal.

Figure 1B:
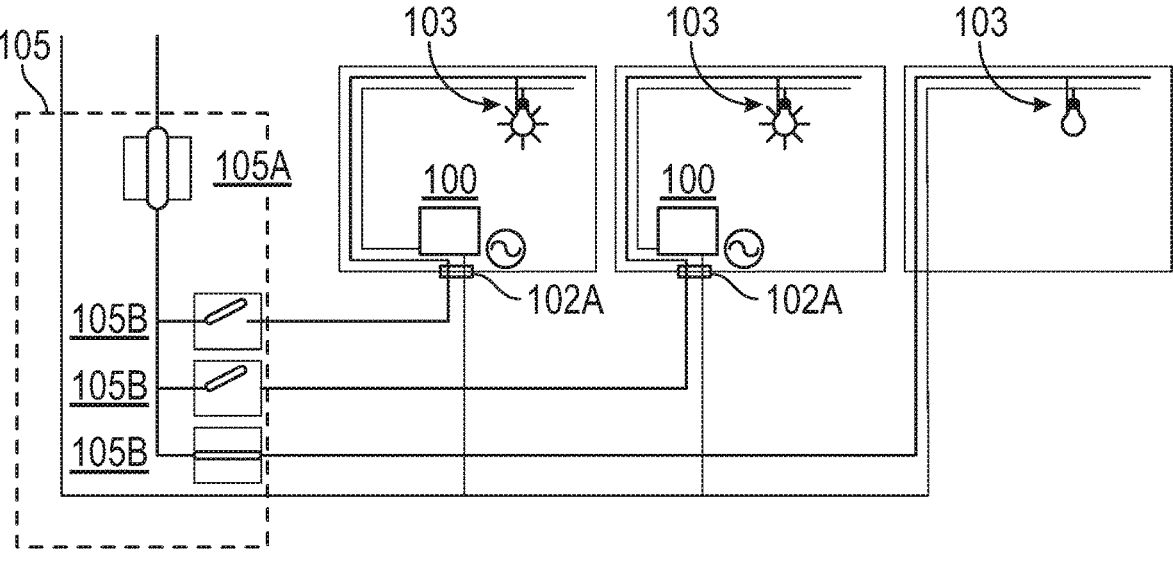
Figure 1C:
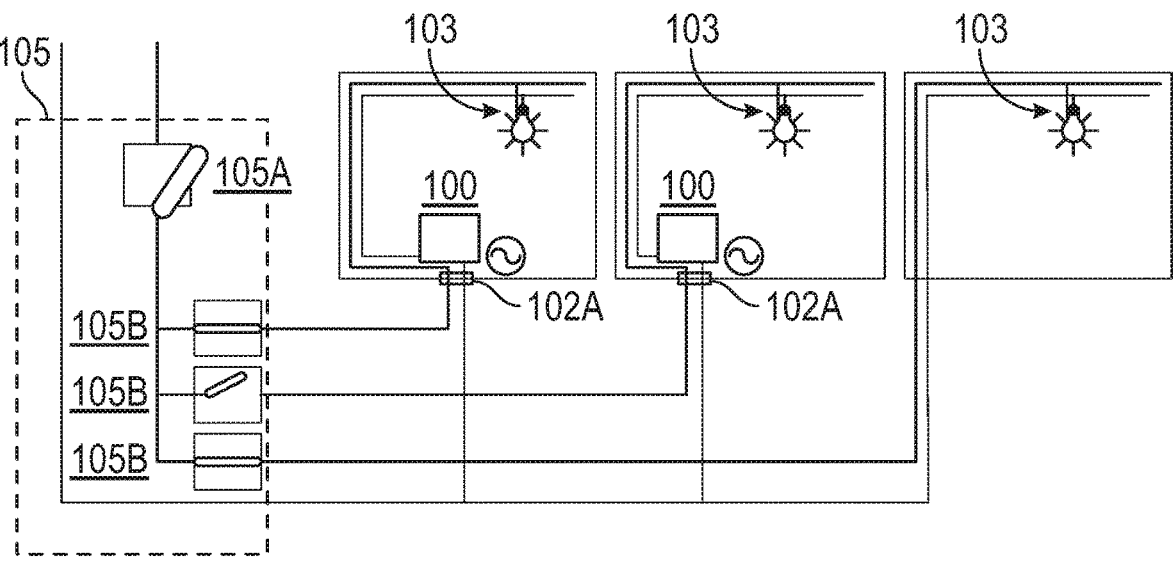

FIGS. 1A-IC provide illustrative examples of how a distributed energy storage unit of this disclosure can avoid backfeeding the mains through an external circuit when the mains is not receiving power while also providing specific control of individual locations, i.e., individual branch circuits, within the external circuit. In FIG. 1A, the external circuit 105 includes a series of circuit breakers 105A, 105B. The circuit breakers include the main circuit breaker 105A and three individual branch circuit breakers 105B. The individual branch circuit breakers 105B are each configured and arranged to control whether power can be provided from mains to an associated circuit branch. Each circuit branch is structured to provide power to a different location/circuit in an environment and each location/circuit can include one or more loads. The environment may include a residential environment or other environments, such as any industrial or commercial environment having power distributed by main circuits and branch circuits. As illustrated in FIGS. 1A-1C, each location/circuit is located in a different room of an environment and each location/circuit includes one load-a light bulb. In other embodiments, the locations/circuits of the branch circuits can be configured in other ways.

The first two rooms further include a DES unit, shown as box 100, that is operatively connected to the external circuit 105, with the third room not including a DES unit 100. When there is no input power to the environment, main circuit breaker 105A is opened to isolate the environment from the mains. Individual branch circuit breakers 105B remain closed and power from the DES 100 in the first and second rooms can be fed back into the external circuit 105. As illustrated in FIG. 1A, the DES units 100 in the first and second rooms energize the loads 103, i.e., the light bulbs, in those rooms via branch circuit breakers 105B, but the third room, which does not have a DES 100 of its own, also has its load 103 energized since the branch circuit breaker 105B for that load 103 is not isolated from the branch circuit breakers 105B for the first two rooms. This situation is potentially undesirable and may cause unnecessary power consumption of the DES 100 disposed in the first two rooms.

FIG. 1B provides another illustrative situation where DES units in accordance with this disclosure are configured to provide power only to specific branch circuits. In FIG. 1B, which has the same layout and numbering scheme as FIG. 1A, the DES units 100 in the first two rooms only provides power to the loads 103 in those rooms as branch circuit breakers 105B for those rooms are operated to open as shown by the illuminated light bulbs. Thus, in this configuration, the opening of branch circuit breakers 105B in the first two rooms isolates the circuits of those rooms from both the branch circuit breaker 105B of the third room and the main circuit breaker 105A. This has the effect of not backfeeding the main circuit breaker 105A and orchestrating power only to desired locations.

FIG. 1C provides another illustrative situation where DES units in accordance with this disclosure are configured to provide power to specific branch circuits and specific loads attached directly to the DES unit. In FIG. 1C, having the same layout and numbering scheme as FIGS. 1A-1B, the DES unit 100 in the first room provides power to loads in the first and third room as the branch circuit breakers 105B for those rooms remain closed. The DES unit 100 in the second room only provides power to the loads 103 attached to the DES unit 100 in the second room as the branch circuit breaker 105B for the second room is operated to open. There is no backfeeding of the mains by the DES unit 100 in the first room as the main breaker 105A is also operated to open. In this configuration, power is orchestrated such that a branch circuit without a DES unit 100, i.e., the third room in FIGS. 1A-IC, can also receive power when the mains power is unavailable.

In. FIGS. 1A-1C, each branch circuit breaker 105B from the external circuit 105 is connected to an individual room in an environment. This is merely meant to illustrate one type of connectivity. There can be different configurations of circuits that are controlled by the operation of one or more branch circuit breakers. As a non-limiting example, circuit breakers are often used to control branched circuits, which in a residential, industrial, or commercial environment may include multiple locations/circuits therein. In another non-limiting example, branch circuit breakers can be disposed to control power delivered to a circuit including more than one load on the branch. This disclosure is in no way limited by the configuration of the external circuit, circuit breakers directing the flow of power within the external circuit, and how the DES units are connected to loads within the external circuit. As further illustrated in FIGS. 1A-1C, each of the individual rooms included a single DES unit. This is only an example, and individual rooms may include additional DES units, e.g., two DES units, three DES units, four DES units, or more, connected in any suitable configuration that meets the power demands of the environment.

Figure 2:
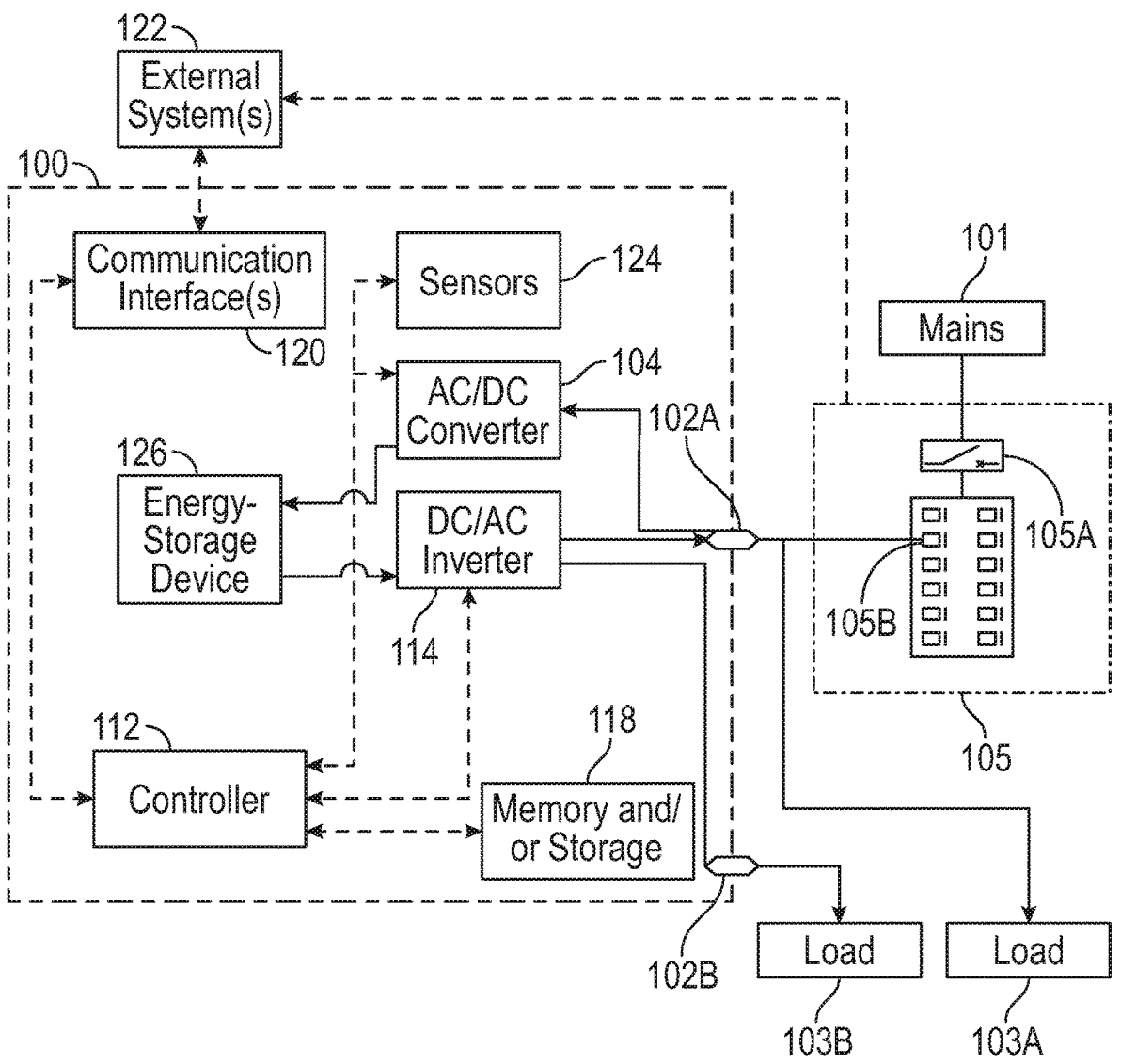
FIG. 2 is a block diagram of an example of a DES unit, according to aspects of the invention.

FIG. 2 is a block diagram of a DES unit 100 according to an example. The DES unit 100 includes a combined input/output terminal 102A, an output terminal 102B, power conversion circuitry that includes an AC/DC converter 104 and a DC/AC inverter 114, at least one controller 112 ("controller 112"), a memory and/or storage 118, one or more communication interfaces 120 ("communication interfaces 120") which may be communicatively coupled to one or more external systems 122 ("external systems 122"), and one or more voltage sensors and/or current sensors 124 ("sensors 124"). The controller 112 controls the operation of the AC/DC converter 104, the DC/AC inverter 114, and various other components as discussed in more detail herein.

The combined input/output terminal 102A of the DES unit 100 is operatively coupled to a first load 103A and an external circuit 105 illustrated in the dashed line box. The external circuit 105 includes a connection to a mains power source 101 e.g., AC mains power supply, that feeds a circuit including a series of circuit breakers. As illustrated, the external circuit 105 includes a main circuit breaker 105A and one or more branch circuit breakers 105B. The external circuit 105 can include only a main circuit breaker 105A or only one or more branch circuit breakers 105B. As illustrated, the DES unit 100 is directly connected to one branch circuit breaker of the one or more branch circuit breakers 105B such that it is coupled to the external circuit 105, in parallel with the first load 103A. In operation, input power derived from the mains 101 is directed into the main circuit breaker 105A and the one or more branch circuit breakers 105B to feed power to the first load 103A coupled to the branch circuit breaker 105B.

The combined input/output terminal 102A is coupled to the AC/DC converter 104 such that it is coupled to the external circuit 105, in parallel with the first load 103A. The AC/DC converter 104 is coupled to the combined input/output terminal 102A, a charger (not shown but appreciated in the art), the energy storage device 126, and the DC/AC inverter 114. The charger may also be coupled to the DC/AC inverter to convert DC power from the energy storage device 126 to DC power that is appropriate, e.g., proper voltage and/or current, for the DC/AC inverter 114. Though AC/DC converter 104 and the DC/AC inverter 114 of the power conversion circuitry are illustrated as two separate components in FIG. 2, both functions may be achieved in a single, bidirectional power inverter/converter solution. The AC/DC converter 104, the charger, the energy storage device 126, and the DC/AC inverter 114 are communicatively coupled to the controller 112. In normal operation, e.g., when the mains 101 is providing input power to the external circuit 105 and the first load 103A, input power is also directed through the combined input/output terminal 102A and to the AC/DC converter 104. The AC/DC converter converts the input power to DC power and the DC power is provided to the charger for regulation and/or voltage/current adjustment. The charger is a DC/DC converter that supplies power to the energy storage device 126, e.g., a battery, as charging power. As disclosed herein, the charger [125] can be adapted to convert DC power from the energy storage device 126 to DC power that is appropriate, e.g., proper voltage and/or current, for the DC/AC inverter 114. When backup power is needed, e.g., when the mains 101 does not deliver input power to the external circuit 105, the stored DC power from the energy storage device 126 is directed to the DC/AC inverter 114 for conversion into AC power that is directed to the combined input/output terminal 102A. The power from the energy storage device 126 is provided to the first load 103A that is coupled to the combined input/output terminal 102A, e.g., located in the same room as the DES unit 100. Absent operation of the main circuit breaker 105A, as discussed below, the power from the energy storage device 126 would also be provided to the external circuit 105, and potentially back to mains 101. However, as discussed below, appropriate operation of the main circuit breaker 105A can prevent such feedback.

For example, in one embodiment, the controller 112 can operate the main circuit breaker 105A of the external circuit 105 to open when the external circuit 105 does not receive power from the mains 101. In this configuration, as illustrated in FIG. 1A, power from the energy storage device 126 will power any closed branch circuit breaker 105B on the external circuit 105 without backfeeding the mains 101. For example, when the main circuit breaker 105A is operated to open, AC power from the DES unit 100 may power any load that is coupled directly to the DES unit 100 and any load that is part of the external circuit, such as load 103C that is not directly coupled to the DES unit 100 but is on a closed branch circuit breaker 105B. Alternatively, or in addition, the controller 112 can selectively operate one or more of the one or more branch circuit breakers 105B to open when the external circuit 105 does not receive power. When the controller 112 selectively operates one or more of the one or more branch circuit breakers 105B to open, the controller 112 can, but is not required, to operate the main circuit breaker 105A of the external circuit 105 to open. In this configuration, as illustrated in FIG. 1B, the main circuit breaker 105A remains closed and one or more branch circuit breakers 105B are selectively opened. Power from the energy storage device 126 is directed to the load 103A and to external circuit 105, as they are coupled in parallel. Similarly, in the configuration illustrated in FIG. 1C, the main circuit breaker 105A is operated to open along with the branch circuit breaker 105B for Room 2. The branch circuit breakers 105B for Rooms 1 and 3 remain closed, thus allowing power from the energy storage device 126 to be directed to the load 103A and to external circuit 105 and on to load 103C. Operation of the one or more branch circuit breakers 105B to open breakers prevents power from the energy storage device 126 from being directed to other branch circuit breakers 105B and the mains 101.

In addition to providing power from the from the energy storage device 126 to the external circuit 105, the DES unit 100 is constructed and arranged to provide power to one or more loads connected directly thereto, i.e., a load connected in series with the DES unit 100. For example, as illustrated in FIG. 2, DES unit 100 includes an output terminal 102B where second load 103B is directly connected thereto. When there is input power from the mains 101, the input power is directed to the second load 103B and excess power is used to provide charging power to the energy storage device 126 as disclosed herein. When the mains 101 does not provide input power to the second load 103B, power from the from the energy storage device 126 is directed to the power conversion circuitry, e.g., the DC/AC converter 114, and provided to the second load 103B.

When the controller 112 of the DES unit 100 determines that the mains 101 is providing input power to the external circuit 105, the controller can operate the main circuit breaker 105A to close. In some embodiments, when the controller 112 of the DES unit 100 determines that the mains 101 is providing input power to the external circuit 105, the controller can operate the one or more branch circuit breakers 105B to close, i.e., return the external circuit 105 to a typical operational condition.

In some examples, the DES unit 100 may be external to at least one energy storage device 126 and may be coupled to the energy storage device 126. In various examples, the DES unit 100 may include one or more energy storage devices, which may include the at least one energy storage device 126. The at least one energy storage device 126 may include one or more batteries, capacitors, flywheels, or other sources of energy storage devices in various examples.

The controller 112 is communicatively coupled to the AC/DC converter 104 and the DC/AC inverter 114 of the power conversion circuitry, the memory and/or storage 118, the communication interfaces 120, the external system(s) 122, the sensors 124, the charger (not shown), and/or the energy storage device 126. As illustrated in FIG. 2, the controller 112 is incorporated into the DES unit 100. Alternatively, the controller 112 may be external and separate to the DES unit 100 while being operatively coupled thereto. The sensors 124 are communicatively coupled to the controller 112 and may be coupled to one or more other components of the DES unit 100, such as the combined input/output terminal 102A, the AC/DC converter 104, and/or the DC/AC inverter 114. As illustrated, the sensors 124 are incorporated into DES unit 100. For example, the sensors 124 may include one or more voltage and/or current sensors coupled to the combined input/output terminal 102A and being configured to sense information indicative of a voltage at the combined input/output terminal 102A and provide the sensed information to the controller 112. In another example, the sensors 124 may include one or more voltage and/or current sensors coupled to the DC/AC inverter 114 and being configured to sense information indicative of an output voltage at the DC/AC inverter 114 and provide the sensed information to the controller 112.

In some embodiments, the sensors 124 are not part of the DES unit 100 directly and are external to the DES unit 100, such as part of external systems 122. For example, sensors 124 can be integrated into one or more components of the external circuit 105, such as main circuit breaker 105A and/or the one or more branch circuit breakers 105B. Sensors that are part of one or more components of the external circuit 105 can communicate with the DES unit 100 by a connection to the communications interface 120 of the DES unit 100 that is operably connected to the controller 112. The connection between any sensors integrated into one or more components of the external circuit 105 and the communications interface of the DES unit 100 can be over a wired connection or over a wireless connection. Examples of wired connections and data transmission standards include, but are not limited to, power-line communication (PLC) and the X10 protocol. Wireless communication protocols include, but are not limited to, BLUETOOTH®, Wi-Fi, e.g., 2.4 GHz, 5 GHZ, etc., IEEE 802.15.4, i.e., Zigbee, and other related wireless communications standards.

In some embodiments, the activity of one or more components of the external circuit, e.g., the main circuit breaker and/or one or more branch circuit breakers, may be controllable using a standalone control application integrated onto an electronic device, such as a cellular telephone or tablet. For example, a web-based application may be used on the electronic device to communicate with and direct the operation of the main circuit breaker and/or one or more branch circuit breakers as disclosed herein to cause any circuit breaker to operate to open or remain close. In this configuration, the web-based application can be used in conjunction with DES units within an environment to direct power to specific circuits of the external circuit without backfeeding the mains. Wireless communication protocols suitable for use with a web-based application include, but are not limited to, BLUETOOTH®, Wi-Fi, e.g., 2.4 GHZ, 5 GHZ, etc., IEEE 802.15.4, i.e., Zigbee, and other related wireless communications standards.

The use of a web-based or API-based application accessible from an electronic device permits the instructions for operating the DES unit, or a plurality of DES units, to be centralized within the application rather than, or in addition to, being stored on a local memory of the controller of the DES unit. In some embodiments, the controller of the DES unit is further configured to communicate with an electronic device running the application that permits operation of at least one of the DES unit or the external circuit from the external device. For example, a web-based or API-based application would determine the number of branch circuit breakers that remain open or closed when the DES unit is not receiving input power from the mains. As disclosed herein, the DES unit provides power to an external circuit using an energy storage device, such as a battery. A web-based or API-based application in operative communication with the DES unit would permit an end user, e.g., a homeowner, to monitor the remaining power capacity of the DES unit's energy storage device and thus coordinate which of the one or more branch circuit breakers or directly coupled loads to operate to orchestrate power delivery. In some embodiments, the web-based or API-based application can provide a notification to an end user, e.g., a pop-up message from the application, a short message service (SMS) message, or the like that power has been restored to the mains or provide other information pertaining to a power outage. When one or more DES units, e.g., a plurality of DES units, are installed in an environment, e.g., each room in a residential or commercial environment, the web-based or API-based application can be operatively connected to all installed DES units. In this configuration, the web-based or API-based application can coordinate the flow of power between DES units and different portions of the external circuit in the environment.

In some embodiments, the web-based or API-based application is an adaptive application, e.g., artificial intelligence or neural network, that is configured to learn power usage patterns from the one or more DES units connected to the external circuit. For example, the web-based or API-based application can determine which specific branch circuit breakers are connected critical loads versus those that are connected to non-critical loads. As a non-limiting example, the web-based or API-based application, once trained by experience in operating the one or more DES units in an environment, can operate branch circuit breakers to optimize power delivery and lifetime of the energy storage device to power critical loads. This is but one example of the use of a web-based or API-based application and this disclosure is not limited by this example. As a non-limiting example, the main circuit breaker 105A and/or the one or more branch circuit breakers 105B of the external circuit 105 can be active circuit breakers that include controllable functions, i.e., "smart" circuit breakers, using a wired or wireless communications protocol, e.g., as disclosed herein. Typically, actively controllable circuit breakers, whether wired or wireless, have a dedicated backup power source connected thereto such that in the event of a loss of power from the mains, the circuit breakers remain functional. This power source may be an external UPS or another type of rechargeable battery-based power source. Alternatively, the circuit breakers may have an internal battery that receives charging power from the mains during operation and can discharge once the mains power is unavailable. In this configuration, and during operation, the main circuit breaker 105A and/or the one or more branch circuit breakers 105B use an on-board current and/or voltage sensor to monitor the input power from the mains 101. Should the mains 101 not provide power, the main circuit breaker 105A and/or the one or more branch circuit breakers 105B provide this data to the controller 112 of the DES unit 100 to, depending on any user settings for the output power, operate the appropriate circuit breakers to open and direct the energy storage device 126 to discharge power to the DC/AC inverter 114 and back into the external circuit 105.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the combined input/output terminal 102A) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the DES unit 100, such as a server, database, laptop computer, desktop computer, tablet computer, smartphone, central controller or data-aggregation system, other UPSs, and so forth.

Figure 3:
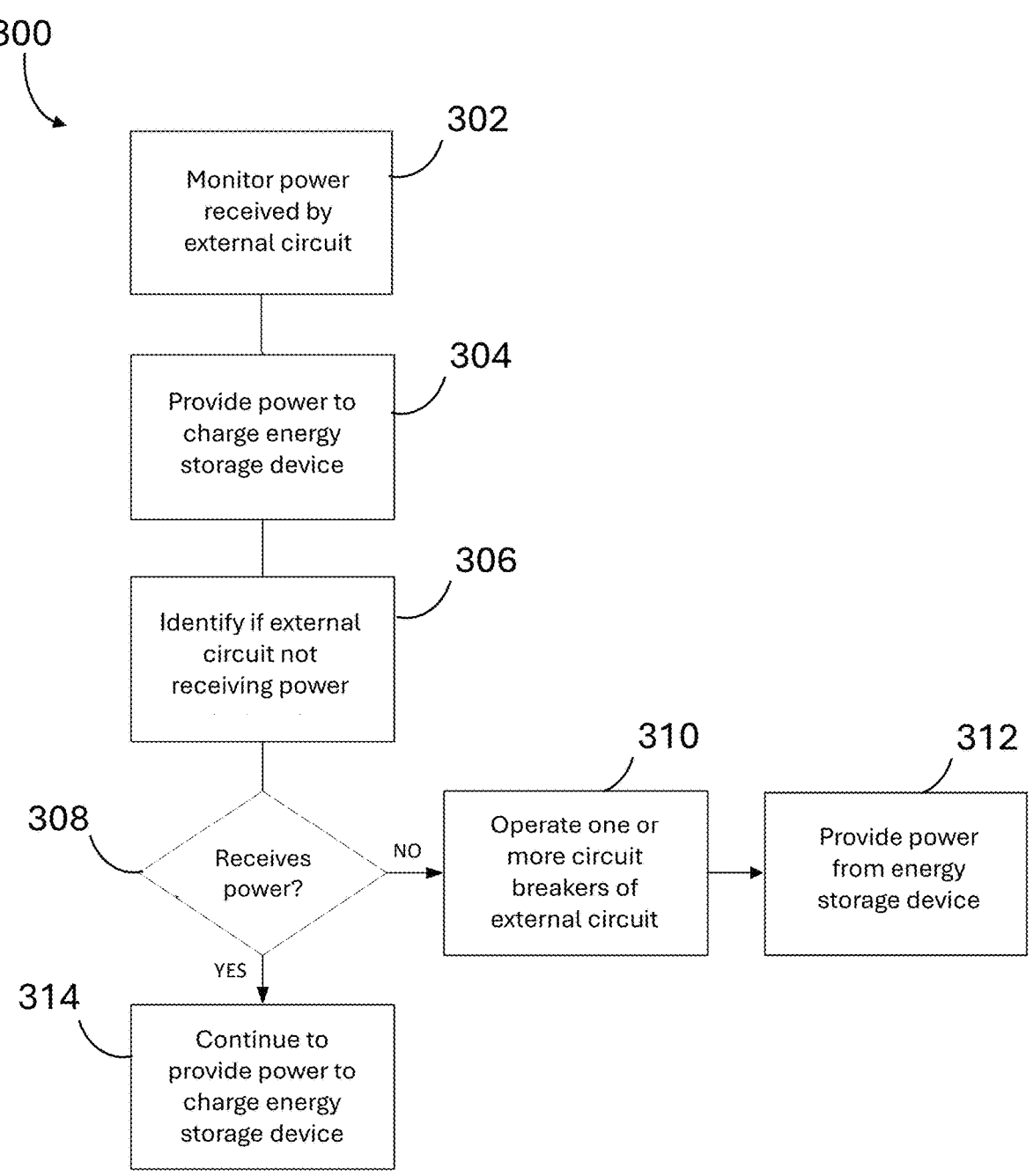
FIG. 3 is a flow chart of the operation of a controller for a DES unit, according to aspects of the invention.

FIG. 3 illustrates a process for operating a DES unit connected to an external circuit, e.g., a circuit breaker panel. In some examples, FIG. 3 illustrates at least part of the process used by the DES unit 100 illustrated in FIG. 2 to control the distribution of power back to the external circuit depending on whether a mains power source is providing input power to the external circuit.

At act 302, the controller 112 monitors the input power received by the external circuit, e.g., using a senor as disclosed herein on one or more of the DES unit 100, main circuit breaker 105A, or the one or more branch circuit breakers 105B and at act 304 charging power is provided to the energy storage device 126 of the DES unit 100. At act 306, the DES unit 100 or a component thereof, e.g., the controller 112, identifies whether the external circuit 105 is not receiving input power from mains 101. The sensor has its values for input power, e.g., current or voltage, measured at act 308 and used to determine whether to continue providing charging power to the energy storage device 126 of the DES unit 100 at act 314 or to provide power from the energy storage device 126 back to the external circuit 105. If the mains 101 does not provide input power to the external circuit 105, the controller 112 directs the operation of a main circuit breaker 105A of the external circuit 105 to open and/or directs the selective operation of one or more branch circuit breakers 105B of the external circuit 105 to open at act 310. Operation of circuit breakers in the external circuit 105, e.g., as disclosed herein, can prevent backup power from being directed back to the mains 101 through main circuit breaker 105A and/or to unintended branch circuits 105. Along with operation of the circuit breakers of the external circuit 105, the controller 112 directs the power conversion circuitry to provide backup power, derived from energy stored on the energy storage device 126, to the combined input/output terminal 102A and out to the external circuit at 105 act 312. As noted herein, if the mains 101 does provide input power to the external circuit 105, the DES unit 100 or a component thereof, e.g., the controller 112, directs the power conversion circuitry to provide, or continue to provide, charging power, derived from the input power, to the energy storage device 126 at act 314. As disclosed herein, an environment may have one or more DES units, e.g., a plurality of DES units, installed and operatively connected to the external circuit. For example, a plurality of DES units may be installed concurrently in the environment. Alternatively, a plurality of DES units may be installed in a scalable manner, e.g., installed over a period of time, to support more loads and/or to increase total run time of connected loads.

In accordance with an aspect, there is provided non-transitory computer-readable medium storing thereon instructions for operating a distributed energy storage unit including a combined input/output terminal coupled to the external circuit, power conversion circuitry operably coupled to the to the combined input/output terminal, an energy storage device operably coupled to the power conversion circuitry, and a controller configured to operate the power conversion circuitry. The instructions for operating the distributed energy storage unit instruct at least one processor of the controller to operate the distributed energy storage unit to monitor an input power received by the external circuit. The instructions for operating the distributed energy storage unit further instruct at least one processor of the controller to operate the distributed energy storage unit to operate the power conversion circuitry to provide charging power, derived from the input power, to the energy storage device. The instructions for operating the distributed energy storage unit instruct at least one processor of the controller to operate the distributed energy storage unit to identify whether the external circuit is not receiving the input power. The instructions for operating the distributed energy storage unit additionally instruct at least one processor of the controller to operate the distributed energy storage unit to operate, in response to the external circuit not receiving the input power, the power conversion circuitry to provide backup power, derived from energy stored on the energy storage device, to the combined input/output terminal.

In further embodiments, the instructions for the operation of the distributed energy storage unit instruct the at least one processor to operate a main circuit breaker of the external circuit to open responsive to the external circuit not receiving power.

In further embodiments, the instructions for the operation of the distributed energy storage unit instruct the at least one processor to operate one or more branch circuit breakers of the external circuit to open responsive to the external circuit not receiving power.

In further embodiments, the instructions for the operation of the distributed energy storage unit instruct the at least one processor to identify when input power is restored to the external circuit. Alternatively, or in addition, the instructions for the operation of the distributed energy storage unit further instruct the at least one processor to operate the main circuit breaker of the external circuit to responsive to the input power being restored to the external circuit.

In further embodiments, the instructions for the operation of the distributed energy storage unit further instruct the at least one processor to operate the one or more branch circuit breakers of the external circuit to responsive to the input power being restored to the external circuit.

In accordance with an aspect, there is provided a method of providing power to an external circuit using a distributed energy storage unit. The distributed energy storage unit includes a combined input/output terminal coupled to the external circuit, power conversion circuitry operably coupled to the to the combined input/output terminal, an energy storage device operably coupled to the power conversion circuitry, and a controller configured to operate the power conversion circuitry. The method includes monitoring power received by the external circuit. The method includes operating the power conversion circuitry to provide charging power, derived from the input power, to the energy storage device. The method further includes identifying whether the external circuit is not receiving input power. The method additionally includes operating, in response to the external circuit not receiving the input power, the power conversion circuitry to provide backup power, derived from energy stored on the energy storage device, to the combined input/output terminal.

In further embodiments, the method includes operating a main circuit breaker of the external circuit to open responsive to the external circuit not receiving the input power.

In further embodiments, the method includes selectively operating one or more branch circuit breakers of the external circuit to open responsive to the external circuit not receiving the input power.

In further embodiments, the method includes identifying when input power is restored to the external circuit. Responsive to input power being restored to the external circuit, the method includes operating the main circuit breaker of the external circuit to close. Alternatively, or in addition, and responsive to input power being restored to the external circuit, the method includes operating the one or more branch circuit breakers of the external circuit to close responsive to input power being restored to the external circuit.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed energy storage (DES) unit configured to be included in a branch circuit comprising one or more loads, the DES unit comprising:
   a combined input/output terminal configured to be coupled to a branch circuit breaker of the branch circuit, and to the one or more loads;
   power conversion circuitry operably coupled to the combined input/output terminal;
   an energy storage device operably coupled to the power conversion circuitry; and
   a controller configured to:
      operate the power conversion circuitry to provide charging power, derived from input power from an external circuit, to the energy storage device;
      identify that the external circuit is not receiving input power; and
      operate, in response to the external circuit not receiving the input power, the power conversion circuitry to provide backup power, derived from energy stored on the energy storage device, to the combined input/output terminal and to the one or more loads through the combined input/output terminal.

2. The DES unit of claim 1, further comprising a sensor configured to detect when the external circuit loses the input power and when the input power is restored to the external circuit.

3. The DES unit of claim 1, wherein the power conversion circuitry comprises a converter configured to convert the input power from the external circuit from AC power to DC power, and to provide the DC power to the energy storage device as the charging power.

4. The DES unit of claim 1, wherein the power conversion circuitry comprises an inverter configured to convert DC power from the energy storage device to AC power and provide the AC power to the combined input/output terminal as the backup power.

5. The DES unit of claim 1, wherein the power conversion circuitry comprises a bidirectional AC-DC converter configured to convert the input power from the external circuit from AC power to DC power and provide the DC power to the energy storage device as the charging power, and further configured to convert DC power from the energy storage device to AC power and provide the AC power to the combined input/output terminal as the backup power.

6. The DES unit of claim 1, wherein the controller is further configured to provide a notification when the input power is restored to the external circuit.

7. The DES unit of claim 1, wherein the controller is further configured to control the branch circuit breaker of the external circuit.

8. The DES unit of claim 1, wherein the controller is further configured to control a main circuit breaker of the external circuit.

9. The DES unit of claim 1, wherein the branch circuit breaker comprises a plurality of branch circuit breakers.

10. The DES unit of claim 8, wherein the controller is further configured to operate the main circuit breaker of the external circuit to open when the external circuit does not receive the input power.

11. The DES unit of claim 1, wherein the controller is configured to selectively operate the branch circuit breaker to open when the external circuit does not receive the input power.

12. The DES unit of claim 11, wherein the controller is further configured to leave closed a main circuit breaker of the external circuit when the external circuit does not have the input power.

13. The DES unit of claim 8, wherein the controller is further configured to operate the main circuit breaker to close in response to the external circuit receiving the input power.

14. The DES unit of claim 9, wherein the controller is further configured to operate the plurality of branch circuit breakers to close in response to the external circuit receiving the input power.

15. The DES unit of claim 1, wherein the controller is further configured to communicate with a main circuit breaker and the branch circuit breaker of the external circuit using a wired connection.

16. The DES unit of claim 1, wherein the controller is further configured to communicate with a main circuit breaker using a wireless connection.

17. The DES unit of claim 1, wherein the controller is further configured to communicate with the branch circuit breaker of the external circuit using a wireless connection.

18. The DES unit of claim 1, wherein when the DES unit is receiving the input power from the external circuit, the power conversion circuitry is further configured to provide output power to the one or more loads coupled to the combined input/output terminal.

19. The DES unit of claim 1, wherein the one or more loads includes a first load, and wherein in providing the backup power to the combined input/output terminal, the power conversion circuitry is further configured to provide the backup power to an output terminal having a second load coupled directly thereto, wherein the second load is connectable in series with the DES unit.

20. The DES unit of claim 1, wherein the controller is further configured to communicate with an electronic device running an application permitting operation of at least one of the DES or the external circuit from the external device.

21. A method of providing power to an external circuit using a distributed energy storage (DES) unit included in a branch circuit comprising one or more loads, and comprising a combined input/output terminal coupled to a branch circuit breaker of the branch circuit and to one or more loads, power conversion circuitry operably coupled to the to the combined input/output terminal, an energy storage device operably coupled to the power conversion circuitry, and a controller configured to operate the power conversion circuitry, the method comprising:

monitoring input power received by the external circuit;

operating the power conversion circuitry to provide charging power, derived from the input power, to the energy storage device;

identifying that the external circuit is not receiving input power; and operating, in response to the external circuit not receiving the input power, the power conversion circuitry to provide backup power, derived from energy stored on the energy storage device, to the combined input/output terminal and to the one or more loads through the combined input/output terminal.

22. The method of claim 21, further comprising operating a main circuit breaker of the external circuit to open responsive to the external circuit not receiving the input power.

23. The method of claim 21, wherein the branch circuit breaker is one of a plurality of branch circuit breakers, the method further comprising selectively operating one or more of the plurality of branch circuit breakers of the external circuit to open responsive to the external circuit not receiving the input power.

24. The method of claim 21, further comprising identifying when input power is restored to the external circuit.

25. The method of claim 22, further comprising operating the main circuit breaker of the external circuit to close responsive to input power being restored to the external circuit.

26. The method of claim 23, further comprising operating the one or more branch circuit breakers of the external circuit to close responsive to input power being restored to the external circuit.

27. The method of claim 21, further comprising connecting one or more additional DES units to the external circuit.

28. A non-transitory computer-readable medium storing thereon instructions for operating a distributed energy storage (DES) unit included in a branch circuit comprising one or more loads, the DES unit comprising a combined input/output terminal coupled to a branch circuit breaker of the branch circuit and to the one or more loads, power conversion circuitry operably coupled to the to the combined input/output terminal, an energy storage device operably coupled to the power conversion circuitry, and a controller configured to operate the power conversion circuitry, the instructions instructing at least one processor of the controller to operate the DES unit to:

monitor an input power received by the external circuit;

operate the power conversion circuitry to provide charging power, derived from the input power, to the energy storage device;

identify whether the external circuit is not receiving the input power; and operate, in response to the external circuit not receiving the input power, the power conversion circuitry to provide backup power, derived from energy stored on the energy storage device, to the combined input/output terminal and to the one or more loads through the combined input/output terminal.

29. The non-transitory computer-readable medium of claim 28, wherein the instructions for the operation of the DES unit instruct the at least one processor to operate a main circuit breaker of the external circuit to open responsive to the external circuit not receiving the input power.

30. The non-transitory computer-readable medium of claim 28, wherein the instructions for the operation of the DES unit instruct the at least one processor to operate the branch circuit breaker of the external circuit to open responsive to the external circuit not receiving the input power.

31. The non-transitory computer-readable medium of claim 28, wherein the instructions for the operation of the DES unit further instruct the at least one processor to identify when the input power is restored to the external circuit.

32. The non-transitory computer-readable medium of claim 29, wherein the instructions for the operation of the DES unit further instruct the at least one processor to operate the main circuit breaker of the external circuit to responsive to the input power being restored to the external circuit.

33. The non-transitory computer-readable medium of claim 30, wherein the instructions for the operation of the DES unit further instruct the at least one processor to operate the branch circuit breaker of the external circuit to responsive to the input power being restored to the external circuit.

\* \* \* \* \*